United States Patent [19]

Nakamura

[11] 4,427,927
[45] Jan. 24, 1984

[54] APPARATUS FOR CONTROLLING ELECTRON BEAM OF IMAGE PICKUP TUBE

[75] Inventor: Takashi Nakamura, Hadano, Japan

[73] Assignee: Sony Corporation, Tokyo, Japan

[21] Appl. No.: 274,171

[22] Filed: Jun. 16, 1981

[30] Foreign Application Priority Data

Jun. 17, 1980 [JP] Japan .................................. 55-82305

[51] Int. Cl.³ ............................................. H01J 29/52
[52] U.S. Cl. .................................... 315/383; 358/219
[58] Field of Search .................. 358/219; 315/10, 383, 315/387, 31 R, 31 TV

[56] References Cited

U.S. PATENT DOCUMENTS

| | | |
|---|---|---|
| 3,417,199 | 12/1968 | Yoshida et al. |
| 3,619,717 | 11/1971 | Lee et al. .......................... 315/383 X |
| 3,975,657 | 8/1976 | Sato et al. |
| 3,999,011 | 12/1976 | Sato et al. ........................... 358/219 |
| 4,206,480 | 6/1980 | Ushijima ............................. 358/219 |
| 4,322,662 | 3/1982 | Nakamura et al. ................. 315/383 |

*Primary Examiner*—Theodore M. Blum

*Attorney, Agent, or Firm*—Lewis H. Eslinger; Alvin Sinderbrand

[57] ABSTRACT

In an image pick-up tube including a diode-type electron gun having a cathode electrode which emits a scanning electron beam and a control electrode which regulates the current of the electron beam at the cathode electrode and through which there is a control electrode current flow during operation of the tube, and a target electrode from which a video output current signal is obtained in correspondence to incident light from an object image projected on the target electrode as the latter is scanned by the electron beam; a beam control voltage signal is generated in response to the video output current signal, the beam control voltage signal is supplied to the control electrode of the electron gun for regulating the current of the electron beam at the cathode electrode, the control electrode current is detected during operation of the tube, and the generation of the beam control voltage signal is controlled in response to a signal corresponding to the detected control electrode current and which preferably determines the gain of an amplifier in the path of the beam control voltage signal.

8 Claims, 4 Drawing Figures

APPARATUS FOR CONTROLLING ELECTRON BEAM OF IMAGE PICKUP TUBE

BACKGROUND OF THE INVENTION

1. Field of the Invention

This invention relates generally to the controlling of an electron beam in an image pick-up tube and, more particularly, is directed to the controlling of the electron beam in an image pick-up tube of the kind having a diode-type electron gun.

2. Description of the Prior Art

Generally, in photoconduction-type image pick-up tubes, such as Vidicons, a cathode electrode emits a beam of electrons of substantially constant current which is directed towards a target electrode having a photo-conversion layer deposited thereon. The electron beam from the cathode electrode is regulated by a first beam control or beam-forming electrode which converges or sharpens the electron beam, and by a second accelerating electrode which further sharpens or focuses the electron beam and accelerates the latter toward the target electrode. The electron beam from the cathode electrode is made to scan the target electrode and, in accordance with the amount of incident light from an object image projected on successively scanned elements of the target electrode, a video output signal is obtained from the latter. More particularly, as the electrons of the accelerated beam impinge upon successively scanned elements of the target electrode, more or less of the impinging electrons are absorbed by the target electrode to neutralize positive charges that reside thereon due to incident light from the object image projected on the target electrode. The varying amounts of electron-absorption provide an output current of corresponding intensities. However, when the amount of light incident on the target electrode of the image pick-up tube increases above a certain value, the constant current electron beam may not have sufficient charge to neutralize all of the positive charges stored at the various elements of the target electrode with a single scanning of the latter by the electron beam, that is, an electron beam shortage may occur. As a result of the failure of the electron beam to neutralize all of the charges on the target electrode, the video output signal will not precisely follow increases in the amount of incident light on the target electrode. Thus, as the amount of incident light increases, the video output signal derived from the target electrode decreasingly corresponds to the actual image viewed by the pick-up tube. Further, in the case of object images having a very high white level, the failure to neutralize all of the charge on the target electrode will cause a white after-image to be depicted by the video output signal even when the pick-up tube or television camera subsequently views another object image of relatively low white level.

If, in order to compensate for the foregoing problem, the current of the electron beam at the cathode electrode is pre-set to a relatively large value so as to avoid insufficient beam current for high levels of incident light, the focusing of the electron beam deteriorates so that the resulting video output signal has poor resolution in respect to the viewed object. The foregoing results from the fact that focusing of the electron beam is reduced with increasing current levels of the beam. Therefore, it is desirable to control the current level of the electron beam in accordance with variations in the level of incident light projected on the target electrode of the pick-up tube.

In one known arrangement for controlling the current level of the electron beam, a voltage corresponding to the video output signal is applied to the first or beam control electrode of the image pick-up tube to increase the current level of the electron beam for higher levels of incident light projected on the target electrode. Thus, the current of the electron beam is increased only for higher levels of incident light so as to avoid substantial deterioration of resolution at normal or lower levels of incident light. However, it has been found that, with the foregoing arrangement, when the voltage applied to the beam control electrode is of a low value, the video output signal does not accurately reflect or is indistinguishable for varying levels of incident light projected on the target electrode. Further, it has been found that the stability of the described arrangement is relatively poor, that is, the range within which the current level of the electron beam can be controlled in a stable manner is very narrow, and unwanted oscillation results.

In order to avoid the foregoing problems, it has been proposed in U.S. Pat. No. 4,322,662, dated Mar. 30, 1982, and having a common Assignee herewith, to provide an image pick-up tube having a diode-type electron gun with a beam current control circuit in which a resistor or relatively high resistance value is connected in series with the beam control electrode to provide an auto feed-back. In such arrangement, the control electrode current flows through the resistor of relatively high resistance, and the voltage drop across such resistor is used for obtaining a desired variation of control voltage. However, since the control signal source is of high impedance, as viewed from the control electrode of the image pick-up tube, such control signal source is liable to be adversely influenced by external noises. Further, many of the constituent devices that need to be associated with the image pick-up tube, such as, amplifiers and the like, have to be selected in consideration of the voltage drop across the resistor of high resistance value, with the result that a power source of relatively high voltage has to be provided.

OBJECTS AND SUMMARY OF THE INVENTION

An object of this invention is to provide an image pick-up tube with an associated beam control circuit which avoids the previously mentioned problems.

More specifically, an object of this invention is to provide a beam control circuit, as aforesaid, which is particularly suitable for use with an image pick-up tube having a diode-type electron gun.

Another object is to provide a beam control circuit for use with an image pick-up tube having a diode-type electron gun and which assures a wide range of stable operation.

A further object is to provide a beam current control circuit, as aforesaid, having a characteristic control curve which can be changed in accordance with the control electrode current so as to obtain a relatively wider range of stable operation.

In accordance with an aspect of this invention, an image pick-up tube including a diode-type electron gun having a cathode electrode for emitting a scanning electron beam and a control electrode for regulating the current of such beam at the cathode electrode and through which there is a control electrode current flow during operation of the tube, and a target electrode from which a video output signal is obtained in correspondence to incident light from an object image projected on the target electrode as the latter is scanned by the electron beam; is combined with a circuit for controlling the electron beam which comprises means for generating a beam control signal in response to the video output signal, means for applying the beam control signal to the control electrode for correspondingly regulating the current of the beam at the cathode electrode, means for detecting the control electrode current flow during operation of the tube, and means for feeding back, to the means for generating the beam control signal, a signal which corresponds to the detected current electrode current flow.

In preferred embodiments of this invention, the means for generating the beam control signal includes an amplifier, such as, a differential amplifier, having a variable gain which is controlled in accordance with the signal corresponding to the detected control electrode current flow. Thus, an image pick-up tube having its beam controlled in accordance with this invention, can be provided with a suitable non-linear control curve for broadening the range of its stable operation.

The above, and other objects, features and advantages of the invention, will be apparent in the following detailed description of illustrative embodiments thereof which is to be read in conjunction with the accompanying drawings.

DETAILED DESCRIPTION OF PREFERRED EMBODIMENTS

Figure 1:
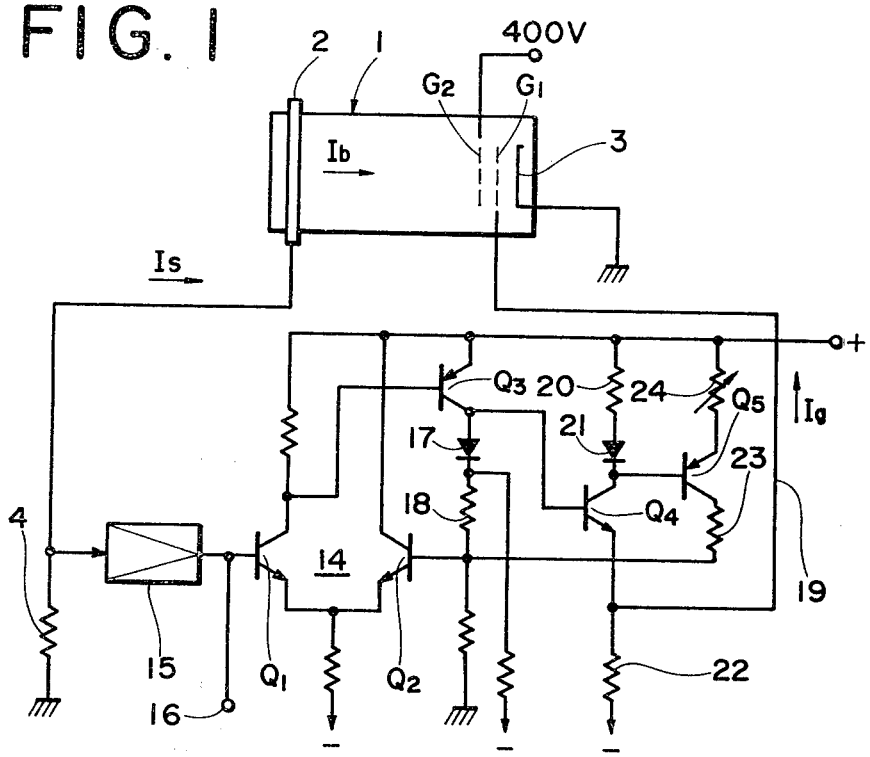
FIG. 1 is a circuit diagram showing an image pick-up tube in combination with a beam control circuit according to an embodiment of this invention.

Referring to the drawings in detail, and initially to FIG. 1 thereof, it will be seen that, in a known image pick-up tube 1 of the type to which this invention is advantageously applied, such image pick-up tube 1 has a diode-type electron gun and includes a target electrode 2 which may be comprised of, for example, a photoconversion layer deposited on a positively charged signal plate (not shown). The photoconversion layer may consist of a mosaic of elements which are non-conductive in the dark, but which become electrically conductive in response to the impingement of light thereon, with the extent of the electrical conductivity depending upon the intensity or amount of such impinging light. Thus, as an object image is projected on target electrode 2, the elements making up the photoconversion layer become more or less conductive in dependence on the intensity of the light falling thereon and, accordingly, experience changes in voltage. Since the signal plate is positively charged, a charge pattern develops on the signal plate which electrically duplicates the light image projected onto the target electrode.

Image pick-up tube 1 is further shown to include a cathode electrode 3 emitting an electron beam which is focused by a beam control electrode $G_1$ and accelerated by an accelerating electrode $G_2$ toward the target electrode 2 for scanning the latter. Scanning of the target electrode 2 by the electron beam is accomplished by external deflection coils (not shown) receiving suitable deflection signals. As electrons of the beam impinge on target electrode 2, some of the electrons are absorbed to neutralize the positive charges that reside there due to the projected object image, and excess electrodes are discarded. The varying amounts of electron-absorption cause target electrode 2 to produce an output current $I_s$ (video output signal) of corresponding intensity that flows through a load resistor 4. The resulting voltage drop across resistor 4 serves as the camera or image pick-up tube output voltage signal. The electron gun structure of image pick-up tube 1 is desirably of the laminar flow type with control electrode $G_1$ being supplied with a positive bias voltage so that a control electrode current $I_g$ flows through beam control electrode $G_1$ during normal operation of the tube.

As previously discussed, when the level of the current $I_b$ of the electron beam emitted from cathode electrode 3 is low, there will be insufficient neutralization of the positive charges on target electrode 2 for high levels of incident light with the result that output current $I_s$ will not satisfactorily reflect increases in the level of light intensity. In contrast, if the current level of the electron beam is pre-set to a relatively large value to avoid this problem, the electron beam will not be properly focused on target electrode 2. In seeking to avoid the foregoing problems, it has been proposed to combine a reference or standard bias current with output current $I_s$ to form an output control voltage across resistor 4 which is then supplied through a linear amplifier (not shown) to produce a control electrode voltage $EG_1$ supplied to beam control electrode $G_1$ for controlling the current level of the electron beam. In such known arrangement, it will be apparent that the current level of the electron beam emitted from cathode electrode 3 is controlled by output current $I_s$ which, in turn, varies with the level of incident light from the object image.

Figure 2:
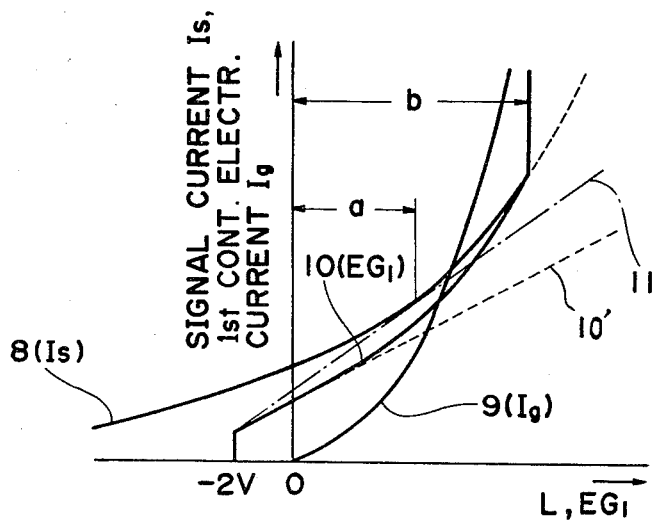
FIG. 2 is a graph to which reference will be made in comparing the operation of the embodiment of this invention shown in FIG. 1 with the operation of a control circuit according to the prior art.

Referring now to FIG. 2, which shows characteristics of the image pick-up tube 1 having a diode-type electron gun, it will be seen that a curve 8 represents variation the output current $I_s$ with changes in a control voltage $EG_1$ applied to control electrode $G_1$. A curve 10', shown in broken lines, represents the relation of the output control voltage (that is, the voltage across load resistor 4) to the control electrode voltage $EG_1$ in the case of the above described prior art arrangement in which the control electrode voltage $EG_1$ varies linearly with the output control voltage, that is, curve 10' is a straight line. As shown on FIG. 2, the slope of straight line curve 10' is relatively small so as to expand the operating range of the circuit. However, because of the divergence between curves 8 and 10', the circuit becomes unstable at higher levels of control electrode voltage $EG_1$ when high levels of incident light are projected on target electrode 2, with the result that undesirable oscillations may occur. This problem may be avoided by increasing the slope or gradient of the control voltage curve, for example, from that of the curve 10' to that of straight line curve 11 shown in dot-dash lines. However, by increasing the slope of control voltage curve 11, there results a consequent reduction in the operating range of the circuit to that indicated at a on FIG. 2, that is, the maximum electron beam current $I_b$ is limited to that corresponding to the intersection of curves 8 and 11 on FIG. 2. Therefore, it is the purpose of this invention to increase the gradient of the control voltage curve, for example, as indicated at 10 on FIG. 2, while, at the same time, increasing the stable operating range of the circuit, for example, to the range indicated at b on FIG. 2, and which is defined by the intersection of control voltage curve 10 and signal current curve 8.

Referring again to FIG. 1, it will be seen that, in a circuit according to an embodiment of this invention for achieving the foregoing, the output signal voltage produced across load resistor 4 by the flow therethrough of signal current $I_s$ is amplified by a preamplifier 15. An output signal from preamplifier 15 is applied to an output terminal 16 where it is available as a video output signal. The output signal from preamplifier 15 is also applied to an input of a differential amplifier 15 which includes first and second NPN transistors $Q_1$ and $Q_2$ each having a base, emitter and collector. The base of transistor $Q_1$ constitutes the input of differential amplifier 14, and the output of the latter is defined by the collector of transistor $Q_1$ from which an output signal of the differential amplifier is supplied to the base of a PNP transistor $Q_3$. The collector output of transistor $Q_3$ is fed back through a diode 17 and a resistor 18 in series to the base of transistor $Q_2$ which defines the gain control electrode of amplifier 14, whereby to set the initial gain of such differential amplifier.

The collector output of transistor $Q_3$ is also supplied to the base of an NPN transistor $Q_4$. The control voltage $EG_1$ is obtained from the emitter of transistor $Q_4$ and is supplied through a line 19 to first control electrode $G_1$. When the control electrode current $I_g$ flowing through control electrode $G_1$ during operation of the image pick-up tube is small, the control voltage $EG_1$ almost follows the signal current $I_s$, that is, at relatively low values of the control electrode current $I_g$, the curves 8 and 10 are approximately parallel to each other.

A resistor 20 and a diode 21 are shown to be connected in series between a positive terminal (+) of a power source and the collector of transistor $Q_4$. The control electrode current $I_g$ flows from such positive terminal of the power source to cathode electrode 3 through resistor 20, diode 21, the collector-emitter path of transistor $Q_4$, line 19 and first control electrode $G_1$. The first control electrode current $I_g$ increases with the quantity of light L incident on target 2 and with the control voltage $EG_1$, as shown on FIG. 2. A resistor 22 is connected between the emitter of transistor $Q_4$ and the negative terminal (−) of the power source and has a very high resistance value, so that the control voltage $EG_1$ in accordance with the signal current $I_s$ is provided at the emitter of transistor $Q_4$. Most of the collector current of transistor $Q_4$ flowing through resistor 20 is constituted by the first control electrode current $I_g$.

Therefore, a voltage proportional to the first control electrode current $I_g$ is produced at the collector of transistor $Q_4$, and such voltage is supplied to the base of a PNP transistor $Q_5$. The collector output of transistor $Q_5$ is fed back through a resistor 23 to the gain control electrode of differential amplifier 14, that is, to the base of transistor $Q_2$. Accordingly, when the first control electrode current $I_g$ increases, as indicated by the curve 9 on FIG. 2, the current flowing through resistor 20 increases to reduce the collector voltage of transistor $Q_4$. In response thereto, the collector current of transistor $Q_5$ is increased, and the base input to transistor $Q_2$ rises. Consequently, the collector current of transistor $Q_1$ of the differential amplifier 14 is decreased, and thus the collector voltage of transistor $Q_1$ rises to decrease the base current of transistor $Q_3$. As a result, the collector voltage of transistor $Q_3$ decreases for correspondingly decreasing the control voltage of first control electrode $G_1$ supplied to the latter through transistor $Q_4$. Thus, in effect, there is a negative feedback to differential amplifier 14 of the control electrode current $I_g$.

On the other hand, the signal current $I_s$, and hence, the base input to transistor $Q_1$, increases with increases in the quantity L of light incident on target 2. The control circuit of FIG. 1 functions to increase the control voltage $EG_1$ with increases in the base input to transistor $Q_1$ of differential amplifier 14. By reason of the feed-back action of transistor $Q_5$, such control voltage $EG_1$ changes in accordance with the curve 10 shown in full lines on FIG. 2. The rate of change of the control voltage $EG_1$ is shown to be gradually increased for the larger quantities L of light incident on the target electrode, with the result that the control range of the maximum beam current is broadened, as indicated at b on FIG. 2. In other words, for beam control circuits according to this invention, the signal current curve 8 intersects the control voltage curve 10 at a relatively large quantity of light so that oscillation of the image pick-up tube is prevented while broadening the control range of the beam current.

The gain of transistor $Q_4$ can be changed by adjustment of a variable resistor 24 connected between the emitter of transistor $Q_5$ and the positive terminal (+) of the power source. Accordingly, the amount of feed-back to differential amplifier 14 can be arbitrarily adjusted for optimizing the control voltage curve 10 of FIG. 2. It will be appreciated that, in view of the foregoing, the resistor 20 for detecting the first control electrode current $I_g$ may be provided with a small resistance value.

In the embodiment of FIG. 1, there is no need to provide a series resistor of large resistance value in the line 19, for example, as provided in U.S. Pat. application Ser. No. 111,189, to which reference has been earlier made, or, if a resistor is provided in line 19, its resistance value may be small. Accordingly, the impedance of transmission line 19 for the control voltage $EG_1$ is low and, therefore, any external noise has little influence on control voltage $EG_1$. Further, since a resistor of large resistance value is not included in the line 19 in the embodiment of FIG. 1, transistor $Q_3$ may have a narrow dynamic range, with the result that the power source for the beam control circuit may have a lower voltage than that required in U.S. application Ser. No. 111,189, in which the voltage drop across a resistor of large resistance value and through which the first control electrode current $I_g$ is made to flow, it utilized for determining the control voltage curve 10.

Figure 3:
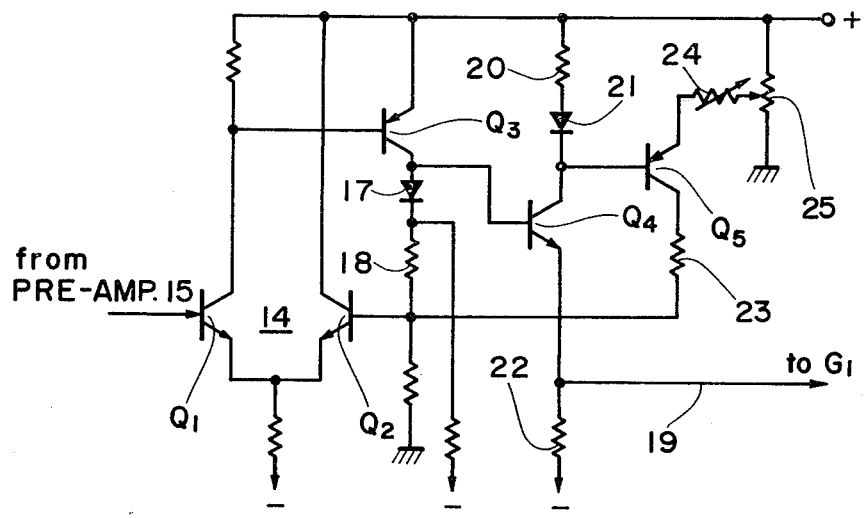
FIG. 3 is a circuit diagram corresponding to a portion of the control circuit shown on FIG. 1, but illustrating another embodiment of this invention.
Figure 4:
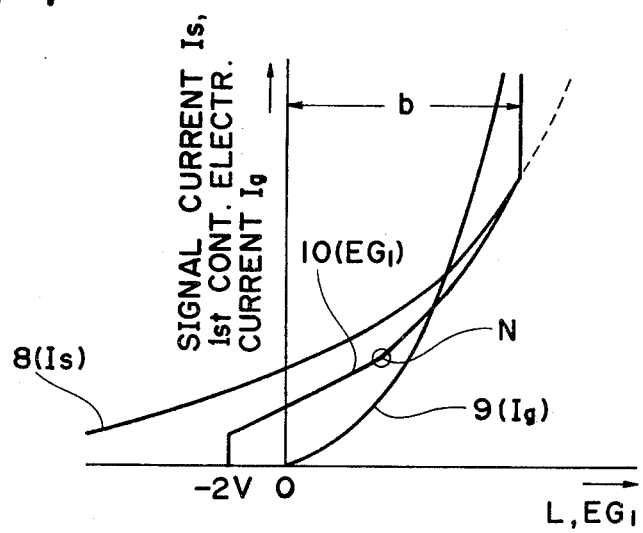
FIG. 4 is a graph to which reference will be made in explaining the operation of the control circuit of FIG. 3.

Referring now to FIG. 3, another embodiment of this invention is there shown to be generally similar to that of FIG. 1, and to have its corresponding components identified by the same reference numerals. In the embodiment of FIG. 3, transistor $Q_5$ turns ON to effect feed-back to differential amplifier 14 only when the first control electrode current $I_g$ flowing through resistor 20 becomes larger than a predetermined value. In order to achieve the foregoing, the emitter of transistor $Q_5$ is connected through variable resistor 24, provided for effecting gain control adjustment to a movable contact of a variable resistor 25 which is connected between the positive terminal (+) of the power source and ground. A threshold level for turning ON transistor $Q_5$ is determined by the setting or adjustment of variable resistor 25. The resulting control voltage curve 10 has a knee point or bend therein, as indicated as N on FIG. 4.

In the embodiments of the invention shown on FIGS. 1 and 3, the difference between the signal current $I_s$ and the detected control electrode current $I_g$ is provided by differential amplifier 14 to effect the negative feed-back. However, in a beam control circuit according to the present invention, the signal current $I_s$ may be amplified by a simple emitter-grounded amplifier so as to provide the control voltage $EG_1$ and, in that case, a current or voltage may be negatively fed back to the emitter-grounded amplifier.

It will be appreciated that, in beam control circuits according to this invention, the control voltage $EG_1$ supplied to the beam control electrode $G_1$ is varied in accordance with the video output signal at terminal 16 so that the current of the scanning beam increases with the quantity of light incident on target electrode 2 of the image pick-up tube. Generally, the current flowing through beam control electrode $G_1$ is detected and negatively fed back to the circuit for forming the control voltage $EG_1$. Accordingly, the rate of increase of the control voltage $EG_1$ can be suppressed relative to the rate of increase of the beam control electrode current I. Since the scanning beam current does not limitlessly increase with the quantity of light incident on the image pick-up tube, the beam can be controlled in a stable manner. Moreover, the foregoing, that is, the stable control of the electron beam, is achieved with the control voltage $EG_1$ being transmitted to beam control electrode $G_1$ with extremely low impedance, whereby the beam control circuit is not significantly influenced by external noise. Moreover, in the embodiments of this invention, the dynamic range for the control voltage may be relatively narrow so that the power source for the beam control circuit can have a relatively low voltage.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In combination with an image pick-up tube including a diode-type electron gun having a cathode electrode for emitting a scanning electron beam and a control electrode for regulating the current of said beam at said cathode electrode and through which there is a control electrode current flow during operation of the tube, and a target electrode from which a video output signal is obtained in correspondence to incident light from an object image projected on said target electrode as the latter is scanned by said electron beam; a circuit for controlling said electron beam comprising:
    nonlinear means for generating a beam control signal in response to said video output signal and having a nonlinear transfer characteristic,
    means for applying said beam control signal to said control electrode for correspondingly regulating said current of the beam at said cathode electrode,
    means for detecting said control electrode current flow during operation of the tube, and
    means for feeding back, to said means for generating the beam control signal, a signal which corresponds to the detected control electrode current flow.

2. The combination according to claim 1; in which said means for generating the beam control signal includes a differential amplifier having input, output and gain control electrodes, means for applying said output signal to said input electrode, and first and second transistors connected in series between said output electrode of the differential amplifier and said control electrode, said signal corresponding to the detected control electrode current flow being applied to said gain control electrode of the differential amplifier.

3. The combination according to claim 2; in which said means for applying said output signal to said input electrode includes pre-amplifier means.

4. The combination according to claim 2; in which said means for detecting said control electrode current flow includes a current detecting resistor; and
    in which said second transistor has an emitter connected with said control electrode of the image pick-up tube and a collector connected with a power source through said current detecting resistor.

5. The combination according to claim 4; in which said means for detecting said control electrode current flow further includes a current detecting transistor having a base connected with said current detecting resistor and a collector connected with said gain control electrode of the differential amplifier.

6. The combination according to claim 5; in which said current detecting transistor has an emitter, and an adjustable bias source is connected with said emitter of the current detecting transistor for determining a knee point of a characteristic curve of said beam control signal.

7. In combination with an image pick-up tube including a diode-type electron gun having a cathode electrode for emitting a scanning electron beam and a control electrode for regulating the current of said beam at said cathode electrode and through which there is a control electrode current flow during operation of the tube, and a target electrode from which a video output signal is obtained in correspondence to incident light from an object image projected on said target electrode as the latter is scanned by said electron beam; a circuit for controlling said electron beam comprising:
    means for generating a beam control signal in response to said video output signal and including amplifier means having a variable gain,
    means for applying said beam control signal to said control electrode for correspondingly regulating said current of the beam at said cathode electrode,
    means for detecting said control electrode current flow during operation of the tube, and
    means for feeding back, to said amplifier means, a signal for controlling said gain which corresponds to the detected control electrode current flow.

8. The combination according to claim 7; in which said means for detecting includes resistor means, means for causing passage through said resistor means of a current corresponding to said control electrode current flow, a transistor having an output applied to said amplifier means for controlling said variable gain of the latter, said transistor further having base and emitter electrodes, and means connecting said base and emitter electrodes with said resistor means through which flows said current corresponding to said control electrode current flow.

* * * * *